Figure 1:
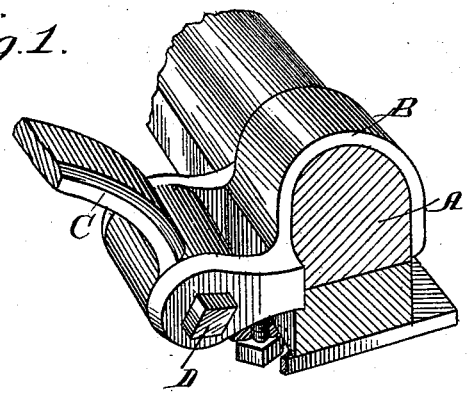

(No Model.)

D. S. BROWN.
THILL COUPLING.

No. 455,011. Patented June 30, 1891.

Witnesses:
Chas O Shorey
C. P. Smith

Inventor:
Dillon S. Brown
By Wiles, Emrie & Bitner
Attys.

THE NORRIS PETERS CO., PHOTO-LITHO., WASHINGTON, D. C.

UNITED STATES PATENT OFFICE.

DILLON S. BROWN, OF GENOA, ILLINOIS.

THILL-COUPLING.

SPECIFICATION forming part of Letters Patent No. 455,011, dated June 30, 1891.

Application filed February 24, 1891. Serial No. 382,330. (No model.)

*To all whom it may concern:*

Be it known that I, DILLON S. BROWN, a citizen of the United States of America, residing at Genoa, in the county of De Kalb and State of Illinois, have invented certain new and useful Improvements in Thill-Couplings, of which the following is a specification.

My invention relates to certain improvements in thill-couplings designed to prevent rattling and at the same time to attain the greatest possible simplicity and durability consistent with a noiseless coupling. These improvements are illustrated in the drawings upon the opposite page, in which—

Figure 2:
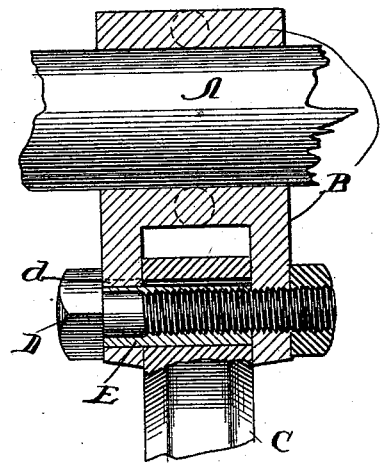

Figure 1 is a sectional perspective showing the general construction of my improved thill-coupling. Fig. 2 is a central horizontal section of the coupling.

Referring to the figures, A is an ordinary axle, B an ordinary clip, and C one of the pole or thill eyes. The latter is held in the clip by means of a bolt D, and to prevent rattling of the eye upon the bolt a cylindrical washer of leather or similar material is interposed between the two which is made to fit tightly between them. To accomplish this and yet enable both washer and bolt to be put into place presents considerable difficulty, which I have overcome by making the hole in one of the ears of the clip large enough to accommodate both bolt and washer, providing a rib $d$ upon the interior of said hole in the clip to prevent the washer from turning therein, and threading the bolt substantially throughout its entire length. This enables the washer and the bolt to be both inserted with perfect ease, as the washer can first be placed in the clip and the eye and the bolt then screwed into it. To remove the same to take out the eye from the clip, the bolt is unscrewed part way until it leaves the thread of the nut, and then by placing a punch upon its end both bolt and washer are driven out without the slightest trouble.

I claim as new and desire to secure by Letters Patent—

The combination, with an eye C, of a clip B, having a hole through one of its forks of substantially the same size as the hole through the eye, a bolt D, threaded substantially throughout its length, a washer E, tightly fitted to the hole in the clip and extending through the eye, and a rib upon the clip adapted to hold said washer against rotation, substantially as described.

DILLON S. BROWN.

Witnesses:
CHAS. A. BROWN,
E. J. WHITNEY.